United States Patent Office 3,164,590
Patented Jan. 5, 1965

3,164,590
HYDRAZIDES OF 4-AMINOMORPHOLINE
Calvin H. Lovell, Morton Grove, Ill., assignor to G. D. Searle & Co., Chicago, Ill., a corporation of Delaware
No Drawing. Filed Aug. 23, 1962, Ser. No. 218,836
4 Claims. (Cl. 260—247.1)

The present invention relates to a group of compounds which are acid derivatives of 4-aminomorpholine. More particularly, the present invention relates to compounds of the following general formula

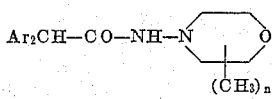

wherein $Ar_2CH-$ is benzhydryl, fluorenyl, 9,10-dihydro-9-anthryl, 9-xanthyl, 9-thioxanthyl, and aromatic halogen derivatives of the compounds, such as 2-chloro-9-thioxanthyl; $n$ is a whole number between 0 and 2 inclusive.

The compounds of the present invention can be prepared by mixing the appropriate acid chloride with a 4-aminomorpholine in an inert solvent such as chloroform or toluene. The mixture is allowed to stand for several hours before the product is isolated. The intermediate 4-aminomorpholines referred to above can be prepared by nitrosating the appropriate morpholine with nitrous acid and reducing the resulting 4-nitroso compound to the corresponding 4-amino compound by means of a reducing agent such as lithium aluminum hydride.

The compounds of this invention are useful because of their valuable pharmacological properties. More particularly, they possess interesting central nervous system activity. Thus, the present compounds possess the ability to reduce psychological conflict and they also possess activity as central nervous system depressants. The present compounds also possess activity as appetite inhibitors and as anti-flammatory agents. The latter is demonstrated by their phenyl-butazone-like effect on edematous conditions.

The compounds which constitute this invention and their preparation will appear more fully from a consideration of the following examples which are given for the purpose of illustration only and are not to be construed as limiting the invention in spirit or in scope. In these examples, quantities are indicated in parts by weight and temperatures in degrees centigrade (° C.).

Example 1

To a suspension of 232 parts of 2-chlorothioxanthene in 1400 parts of ether is added, with stirring, a solution of 70 parts of butyl lithium in heptane. The resultant solution is refluxed for 3 hours and poured into a slurry of dry ice and ether. This mixture is allowed to stand for 15 hours and then potassium hydroxide solution is added to dissolve the precipitated carboxylic acid salt. The aqueous layer is separated and acidified with hydrochloric acid. The solid which precipitates is separated and recrystallized from 2-propanol to give 2-chloro-9-thioxanthenecarboxylic acid melting at about 225–227° C.

Example 2

A suspension of 15 parts of 9-thioxanthenecarboxylic acid in 130 parts of dry toluene is heated to reflux and 11.9 parts of thionyl chloride is added. The resultant mixture is refluxed for 2 hours and the solvent and excess thionyl chloride are removed under reduced pressure. Addition of hexane to the residue causes it to crystallize. This solid is 9-thioxanthenecarbonyl chloride and it is used in the next step without further purification.

In the same manner, 2-chloro-9-thioxanthenecarboxylic acid is converted to 2-chloro-9-thioxanthenecarbonyl chloride and 9,10-dihydro-9-anthracenecarboxylic acid is converted to 9,10-dihydro-9-anthracenecarbonyl chloride.

Example 3

To a solution of 115 parts of 2,6-dimethylmorpholine in 200 parts of water and 100 parts of concentrated hydrochloric acid is added portionwise at 50° C. with stirring, a solution of 75 parts of sodium nitrite in 100 parts of water. The mixture is allowed to stand for one hour before it is extracted with ether. The ether layer is separated and dried, and the solvent is evaporated under reduced pressure. The residue is distilled to give 2,6-dimethyl-4-nitrosomorpholine boiling at about 65–68° C. at 1 mm. pressure.

A suspension of 26.3 parts of lithium aluminum hydride in 1400 parts of tetrahydrofuran is heated to reflux and a solution of 124 parts of 2,6-dimethyl-4-nitrosomorpholine in 990 parts of tetrahydrofuran is added portionwise. When the addition is complete, the mixture is refluxed for an additional 1.5 hours and then decomposed by the cautious addition of 28 parts of water. 21 parts of 20% sodium hydroxide solution and then 98 parts of water are added to the reaction mixture. The reaction mixture is filtered to remove the precipitated salts, and the organic solution is distilled. This gives 2,6-dimethyl-4-aminomorpholine boiling at about 63–67° C. (10 mm.).

In the same manner, morpholine is converted to 4-aminomorpholine, 3-methylmorpholine is converted to 4-amino-3-methylmorpholine, and 2,5-dimethylmorpholine is converted to 4-amino-2,5-dimethylmorpholine.

Example 4

A solution of 10.2 parts of 4-aminomorpholine and 75 parts of chloroform is added to a solution of 24.4 parts of 9-xanthenecarbonyl chloride in 255 parts of chloroform. The reaction mixture is allowed to stand for 16 hours before it is filtered to remove precipitated product. The solid is suspended in potassium hydroxide solution and the mixture is extracted with chloroform. The chloroform extract is dried and the solvent is evaporated. Recrystallization of the residual solid from ethyl acetate gives N-morpholino-9-xanthenecarboxamide melting at about 258–263° C. This compound has the following formula

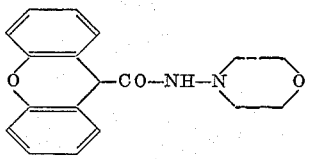

Example 5

10 parts of 9-thioxanthenecarbonyl chloride is added to a solution of 8 parts of 4-aminomorpholine in 150 parts of chloroform. The mixture is refluxed for 2 hours and then allowed to stand for 15 hours before it is filtered. The filtrate is washed first with water and then with potassium carbonate solution and finally dried. The solvent is then evaporated from the solution and the residue is recrystallized from absolute ethanol to give N-morpholino-9-thioxanthenecarboxamide melting at about 247–250° C. with decomposition.

Example 6

11.5 parts of diphenylacetyl chloride is added to a solution of 10.2 parts of 4-aminomorpholine in chloroform. The reaction mixture is allowed to stand for about 4 hours before it is filtered to remove the precipitated solid. The filtrate is mixed with water and potassium carbonate and the chloroform layer is separated. The chloroform solution is dried and concentrated to give crude N-morpholinodiphenylacetamide. This compound melts at about 154–156° C. after recrystallization from absolute ethanol.

If 11.5 parts of 9-fluorenecarbonyl chloride is substituted for the diphenylacetyl chloride and the above procedure is repeated, the product is N-morpholino-9-fluorenecarboxamide, melting at about 270–272° C. after recrystallization from absolute ethanol. This compound has the following formula

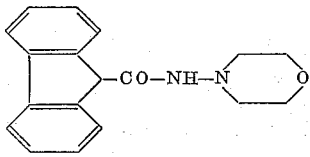

Example 7

To a solution of 7.8 parts of 2,6-dimethyl-4-aminomorpholine in toluene is added 6.9 parts of diphenylacetyl chloride. This mixture is allowed to stand for about 6 hours. The mixture is filtered to remove the precipitated product which is then suspended in an aqueous solution of excess potassium carbonate. The aqueous mixture is extracted with chloroform and the dried chloroform solution is concentrated to give crude N-(2,6-dimethylmorpholino) diphenylacetamide. This product melts at about 205–208° C. after recrystallization from ethyl alcohol.

If 7.3 parts of 9-xanthenecarbonyl chloride is substituted for the diphenylacetyl chloride and the above procedure is repeated, the product is N-(2,6-dimethylmorpholino)-9-xanthenecarboxamide melting at about 265–268° C. after recrystallization from absolute ethanol.

Example 8

To a solution of 7.8 parts of 2,6-dimethyl-4-aminomorpholine in toluene is added 8 parts of 9-thioxanthenecarbonyl chloride. The resultant mixture is allowed to stand for 6 hours before it is filtered to remove the precipitated solid. The solid product is suspended in a solution of excess potassium carbonate and the resultant mixture is extracted with chloroform. Evaporation of the solvent from the dry chloroform extract leaves a residue of crude N-(2,6-dimethylmorpholino)-9-thioxanthenecarboxamide which melts at about 220–222° C. after recrystallization from absolute ethanol.

Example 9

9,10-dihydro-9-anthracenecarbonyl chloride is reacted with 4-amino-3-methylmorpholine according to the procedure described in Example 8. This gives N-(3-methylmorpholino)-9,10-dihydro-9-anthracenecarboxamide.

Likewise, if 2-chloro-9-thioxanthenecarbonyl chloride is reacted with 4-amino-2,5-dimethylmorpholine, the product is N-(2,5-dimethylmorpholino)-2-chloro-9-thioxanthenecarboxamide. This compound has the following formula

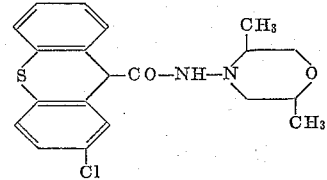

What is claimed is:
1. A compound of the formula

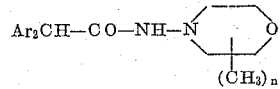

wherein $Ar_2CH$— is selected from the group consisting of benzhydryl, 9-fluorenyl, 9,10-dihydro-9-anthryl, 9-xanthyl, 9-thioxanthyl, and 2-chloro-9-thioxanthyl; and $n$ is a whole number between 0 and 2 inclusive.

2. A compound of the formula

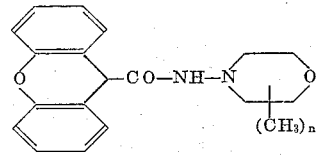

wherein $n$ is a whole number between 0 and 2 inclusive.
3. N-morpholino-9-xanthenecarboxamide.
4. N-morpholino-9-thioxanthenecarboxamide.

References Cited in the file of this patent
UNITED STATES PATENTS

| 2,661,351 | Cusic | Dec. 1, 1953 |
| 2,661,353 | Cusic | Dec. 1, 1953 |
| 2,977,359 | Rutschmann | Mar. 28, 1961 |